R. S. BRYANT.
RIM FOR VEHICLE WHEELS.
APPLICATION FILED SEPT. 2, 1913.
1,268,211.
Patented June 4, 1918.
2 SHEETS—SHEET 1.
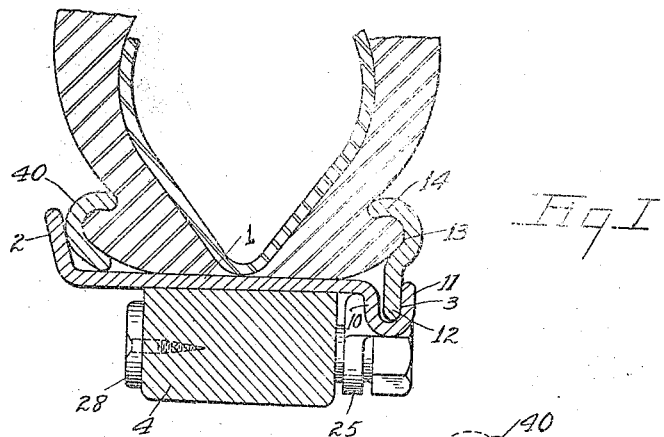
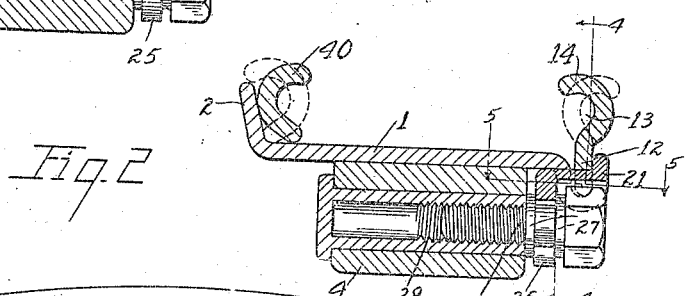
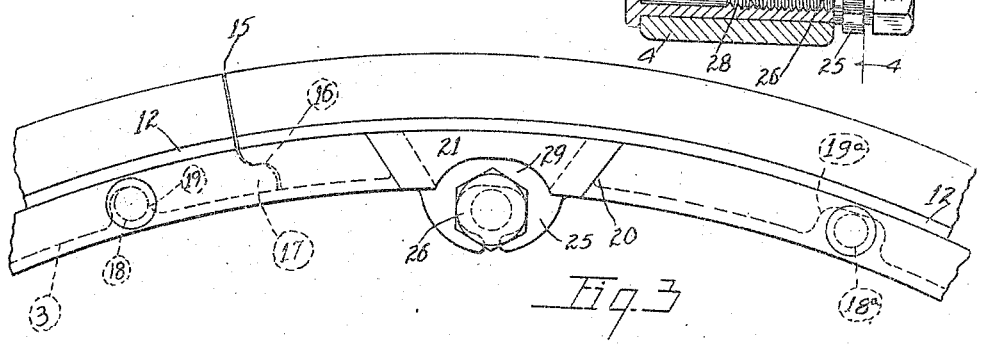
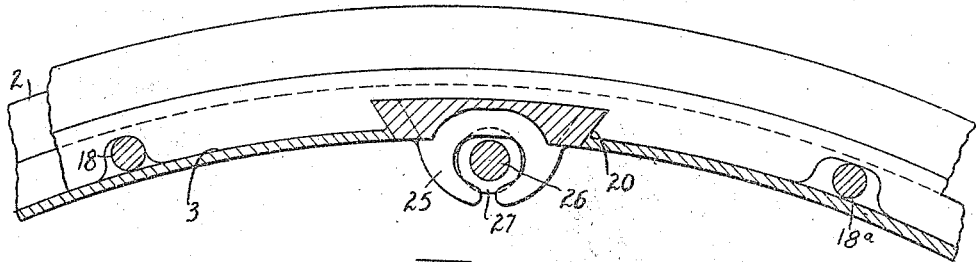
Witnesses
R. E. Caspell.
Alice B. Moore.
Inventor
Richard S. Bryant
By Mell & Smith
Attys.

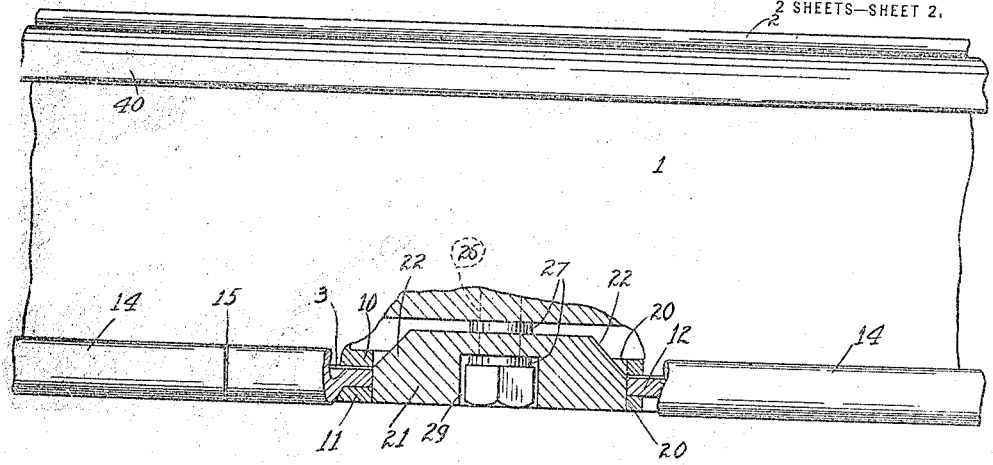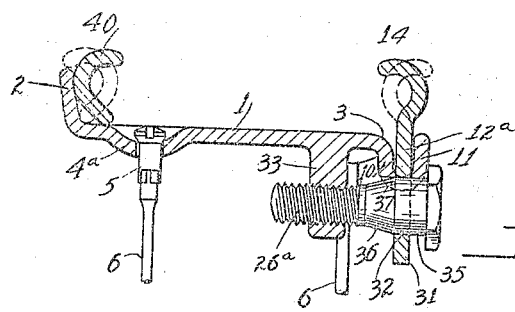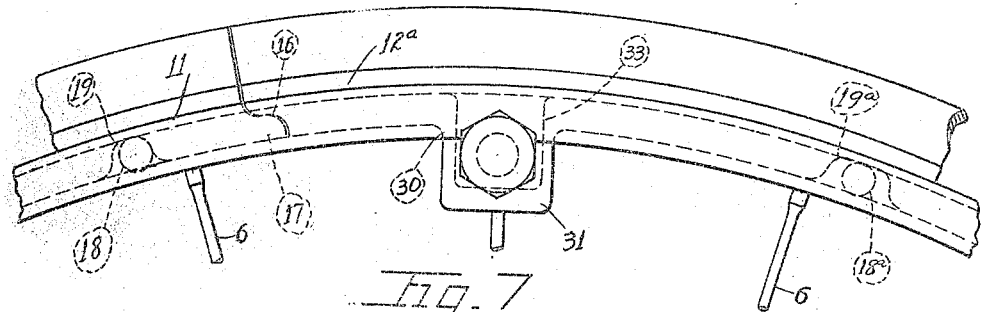

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,268,211.  Specification of Letters Patent.  Patented June 4, 1918.

Application filed September 2, 1913. Serial No. 787,786.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to rims for vehicle wheels of the type employed to secure a pneumatic or other resilient tire in place thereon and permit the ready removal of the same therefrom for purposes of repair or replacement. According to the usual contemporary practice, such rims generally take the form of a circular band embracing the wheel felly and provided with outwardly projecting lateral flanges adapted to engage the sides of the tire, these flanges having different shapes according to the type of tire with which they are to be used. In order to facilitate the removal and replacement of the tire one or both of these flanges are sometimes made separate from the rest of the rim and detachably secured thereto, but difficulty has sometimes been experienced in securing such flange or flanges to the rim in such a manner as to be strong and reliable under all incidents of use, and yet be readily removable and replaceable in case of need. It is also necessary that the securing means be simple and easily operated and that the weight of the whole rim be kept at the very lowest possible point not only on account of the expense of the metal, but because the inertia of a heavy wheel increases the cost of operation of the vehicle in case the vehicle be self-propelled.

Accordingly the objects of this invention are the provision of a new and improved construction of rim and flange which shall permit the secure attachment of the flange to the rim for purposes of use, while allowing the ready removal thereof upon occasion, and at the same time possess a minimum of weight and complexity; the provision of a construction of rim and flange by which the flange can be secured as easily in reverse position as in direct position; the provision of a device comprising the fewest possible parts; the provision of a rim and flange construction wherein all of the parts can be made by cold rolling ordinary stock steel and without the necessity for changing appreciably the thickness of the same at any point; while further objects and advantages of the invention will become apparent in the course of the following description and claims.

Generally speaking my invention may be defined as consisting of the combinations of elements recited in the claims hereto annexed and illustrated in the drawings accompanying and forming a part hereof, wherein: Figure 1 is a transverse, cross-sectional view of a rim constructed in accordance with my invention showing a tire in place therein, the line of section being taken at one side of the flange-securing device; Fig. 2 is a similar cross-sectional view, the line of section passing through the flange securing device and the tire being omitted; Fig. 3 represents a side elevation of a portion of a rim and flange constructed in accordance with my invention; Fig. 4 is a longitudinal, cross-sectional view taken upon the broken line 4—4 in Fig. 2; Fig. 5 is a cross-sectional view taken upon the line 5—5 in Fig. 2 and looking downwardly; Fig. 6 is a cross-sectional view of a modified form of my invention showing the same in connection with a wire-spoked wheel; and Fig. 7 represents a side elevation of a portion of the wheel shown in Fig. 6.

The tire supporting rim which I prefer to employ in connection with the present invention consists of a one-piece circular member of sheet metal having a substantially cylindrical portion 1 of a proper width to receive the size of tire desired, the rearward side of this member being formed with an outstanding flange 2 and the forward side being rolled to form an annular groove 3. Inasmuch as this rim is designed largely for lightness I have in these drawings illustrated it as applied to the wheel in the lightest and simplest possible mode, viz: in Figs. 1 and 2 by being shrunk directly upon the felly 4, in case a wooden wheel be employed, and in Figs. 6 and 7 by being formed at intervals with depressions $4^a$ adapted for the reception of the nipples 5 of wire spokes 6; it will be understood, however, that the features of my invention could be employed in connection with a demountable or other complex rim if desired, without departing from the scope of my inventive idea.

The groove 3 is formed by bending the metal of the rim first abruptly inwardly to form an inner wall 10 and then abruptly outwardly to form an outer wall 11 parallel to said first wall, the top of the wall 11 being not materially, if any, above the surface of the cylindrical portion 1. Mounted in this groove is a flat annular split-ring or side flange 12, the outer edge whereof is formed to fit the side walls of the tire which is to be used therewith. In the present case the projecting portion of this ring is deflected sidewise to form a shallow groove 13 adapted to receive the bead or clench of a clencher tire, the outer margin of the flange being rolled inwardly as at 14 so as to embrace this clench as usual. The amount of displacement employed in the formation of this groove 13 is so chosen that when the flange is reversed, as illustrated in dotted lines in Figs. 2 and 6, its convex face will stand at the proper point to receive a straight wall tire. The inner portion of the ring is formed as a flat web adapted to fit rather snugly within the groove, the groove being of considerable depth as compared with its width so that the ring may have a secure bearing against its walls.

The ends of this flange abut closely together as illustrated at 15 in Fig. 3, one of the ends being arranged to radially overlie the other end as by being formed with a notch or recess 16 adjacent to the inner edge and the other end with a tongue 17 projecting into that notch. Also the groove 3 is intersected at one point by an abutment member 18 such as a rivet secured in the walls 10 and 11 and traversing the groove, while the underlying end of the ring is notched at 19 so as to straddle this rivet.

At the opposite side of the split 15 from the abutment 18, the walls 10 and 11 are intersected by a transverse dove-tailed notch 20, said notch having its widest portion at the point farthest from the center of the wheel and terminating substantially on a line with the interior face of the cylindrical portion 1, as shown in Fig. 2. The flat inner portion of the ring is also formed with a similar notch adapted to register with the notch 20.

Into this notch is inserted the wedge block 21 which is formed to fit snugly therein and thus key the end of the ring 12 securely within the groove 3. The inner end of the block 21 is preferably beveled as illustrated at 22 so as to draw the overlying end of the ring toward the underlying end. The bottom face of the block is formed with a bracket 25 adapted for the reception of a securing member, here shown as a screw 26 having a shoulder 27 at each side of the bracket so as to shift the wedge block in either direction. In the embodiment illustrated in Figs. 1 and 2, the felly 4 is provided with a threaded metallic sleeve 28 for the reception of this screw, while the wedge block is recessed on its outer face, as illustrated at 29 for the reception of the screw head. The bracket 25 herein illustrated is formed of a pair of horns having their extremities bent to embrace the screw.

It will be obvious that the insertion of the wedge block 21 into the notch 20 will draw the overlying end of the ring 12 toward the underlying end thereof so as to secure the latter against radial movement while the abutment 18 holds the same against circumferential movement. A second obstructing member 18$^a$ is provided at the opposite side of the notch 20 from the member 18 for use when the flange is reversed. The overlying end of the ring is provided with a notch 19$^a$ permitting the ring to be applied and moved circumferentially through a limited arc without interference from this second obstructing member.

In Figs. 6 and 7 I have illustrated a slightly modified construction which is simpler in character and is particularly adapted for use with wire spoked rims although not limited to such use. In this embodiment the same groove 3 with its walls 10 and 11 and obstructing members 18 and 18$^a$ are provided as before. Also the ring 12$^a$ is similar to that previously described in that it has a portion fitted snugly within the groove 3 and notched at 18$^a$ and 19$^a$, and provided with a recess 16 and tongue 17 as before. The bottom of the groove 3 is cut away at one point to form a slot 30, and the web of the ring 12$^a$ is extended radially inward to form a projection or ear 31 adapted to project through this slot. The ear 31 is formed with an aperture 32 and the inner face of the circular member 1 is formed with a bracket 33 having therein a threaded aperture. Threaded into this bracket is a screw 26$^a$ having adjacent to its outer end an enlarged portion 35 adapted to fit snugly within the aperture 32, the enlargement 35 merging into the threaded portion of the screw by means of a tapered or conical portion 36. Preferably, when the device is assembled, the portion 35 of the screw engages a rounded notch 37 formed in the bottom edge of the walls 10 and 11 so that no strain may be put upon the threaded portion 26$^a$.

It will be seen that the general idea of the device shown in Figs. 6 and 7, is exactly the same as that in the preceding views, the screw shown in Figs. 6 and 7 itself carrying the wedge member, while in the preceding views the wedge member is separate from the screw. If the screw shown in Figs. 6 and 7 be removed, the ring 12$^a$ is immediately freed, while upon the insertion of this screw through the aperture 32 into the bracket 33, the interaction of the inclined portion 36 with the walls of the notch 37 and the aperture 32 serves to draw the ring forcibly into place.

The opposite side of the rim may be treated in any suitable or desired manner. In the present case I have illustrated the member 1 as provided with a floating ring 40 rolled up of sheet metal and having one side concave for the reception of the clenches or beads of a clencher tire, and the other side convex. The size and shape of this ring is such as to enable it to be employed in either position as shown in the full and dotted lines in Figs. 2 and 6, and the height of the same and of the flange 2 may desirably be made such that upon the location of the ring as shown in dotted lines, the outer margin of the ring engages the outer margin of the flange at the same instant that the inner margin engages the base of the flange, thus stiffening the construction and avoiding the formation of a recess which would accumulate sand and filth.

It will be obvious that the wedging member could take many other forms than those herein suggested, that the mode of its engagement with the ring could be widely varied, and generally that many changes could be made without materially affecting the operation of the device. While I have described my invention in detail, I do not, therefore, propose to limit myself to such details except as the same may be positively included in the claims hereto annexed or may be rendered necessary by the prior state of the art.

Having thus described my invention, what I claim is:—

1. In a device of the character described, the combination with a tire-supporting rim having a circumferential groove adjacent one edge and a transverse abutment in said groove; of a split side-flange adapted to seat in such groove the ends of said flange being formed so that one shall radially overlie the other, the underlying end having a notch on its inner edge adapted to engage said abutment and the overlying end of said flange having a portion adapted to project through such groove; and a movable wedge member carried by said rim and adapted to slidably engage the projecting portion of said flange and secure the same in place.

2. In a device of the character described, the combination with a tire-supporting rim; of a reversible split side-flange adapted to surround the same, the ends of said flange being formed so that one shall radially overlie the other; means carried by said rim and adapted to engage the overlying end of said flange and secure the same against radial movement; and other means on opposite sides of said securing means respectively arranged to engage the underlying end of said flange in either position of the latter and to hold such end against circumferential movement.

3. In a device of the character described, the combination with a tire-supporting rim; of a reversible split side-flange adapted to surround the same, the ends of said flange being formed so that one shall radially overlie the other and the underlying end having a notch upon its inner surface; means carried by said rim and adapted to engage the overlying end of said flange and secure the same against radial movement; and abutments carried by said rim at opposite sides of said securing means, one of said abutments being arranged to engage such notch in one position of said flange and the other in reversed position of the latter, the overlying end of said flange being also formed with a notch adapted to straddle the other of said abutments.

4. In a device of the character described, in combination, a circular member having a slot, a split ring adapted to surround said member and having adjacent to one of its ends a projection adapted to enter said slot, the end having the projection being arranged to overlie the other end of the ring, said circular member being provided at each side of said slot with means adapted for engagement by the underlying end of said ring and the underlying end of said ring being formed for engagement with one or the other of said means depending upon whether said ring is applied in direct or reversed position, and a device adapted to engage said projection and retain said overlying end in engagement with said underlying end.

5. In a device of the character described, the combination, with a circular member having a groove running therearound, of a split ring adapted to surround said circular member and fit in said groove, the ends of said ring being formed so that one shall overlie the other and the underlying end having a notch in its inner edge, an abutment within said groove and adapted to engage said notch, said circular member and said overlying end having registering notches, and wedge means adapted to enter said notches and draw said overlying end against said underlying end.

6. In a vehicle wheel, the combination, with a circular member having a groove running therearound, said circular member being adapted for the reception of a tire, of a split ring adapted to surround said member, said ring having a portion adapted to fit within said groove and another portion adapted to engage the wall of the tire, said groove and the first mentioned portion of said ring being symmetrical to permit the reversal of said ring and the last named portion of said ring being asymmetrical so as to coöperate with tires of different types, the ends of said ring being formed with interfitting portions and the groove-entering portion of said ring being notched adjacent to each end of the ring, abutments within said groove adapted to enter said notches, and a wedge member adapted to engage said circular member and said ring, the walls of said groove and the inner portion of said ring being notched for the reception of said wedge member.

7. In a vehicle wheel, the combination, with a circular member having a groove running therearound and a notch intersecting said groove, of a split ring adapted to surround said circular member and having its inner portion adapted to fit within said groove; the ends of said ring being formed so that a part of the one shall overlie a part of the other, interfitting means carried by said circular member and the underlying part of said ring whereby said underlying part shall be secured against circumferential motion, and a wedge member adapted to fit within said notch and engage the overlying end of said ring, the inner portion of said ring adjacent to said overlying end being slotted for the reception of said wedge member.

8. In a vehicle wheel, the combination, with a circular member having a groove running therearound and a notch intersecting said groove, of a split ring surrounding said circular member and having its inner portion fitting in said groove, the ends of said ring being so formed that a part of the one overlies a part of the other and the inner portion of said ring being formed adjacent to such overlying end with a notch or aperture registering with said first notch, interfitting means carried by said circular member and the inner portion of said ring adjacent to the underlying end thereof whereby said underlying end is secured against circumferential movement, a threaded member carried by said circular member in alinement with said notch, and a wedge member carried by said threaded member and lying in said notch and securing the overlying end of said ring in engagement with the underlying end thereof.

In testimony whereof, I hereunto affix my signature in the presence of two witnesses.

RICHARD S. BRYANT.

Witnesses:
BRENNAN B. WEST,
HAROLD E. SMITH.